D. F. GREEN.
EYEGLASS MOUNTING.
APPLICATION FILED SEPT. 30, 1916.
1,233,570.
Patented July 17, 1917.
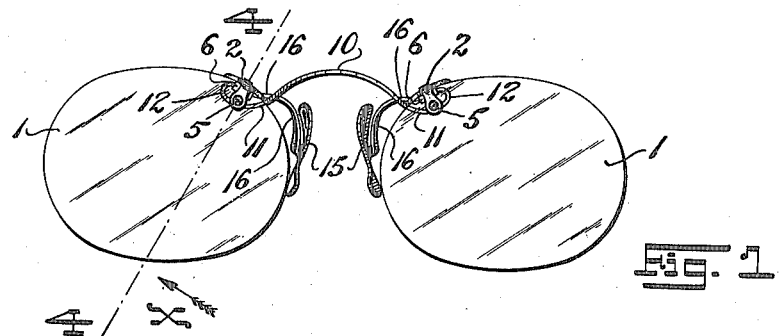
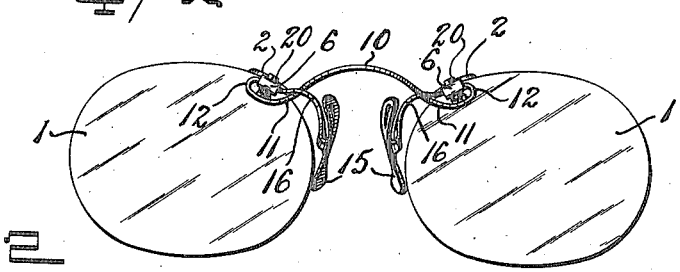
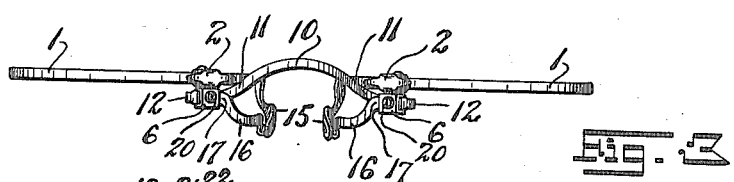
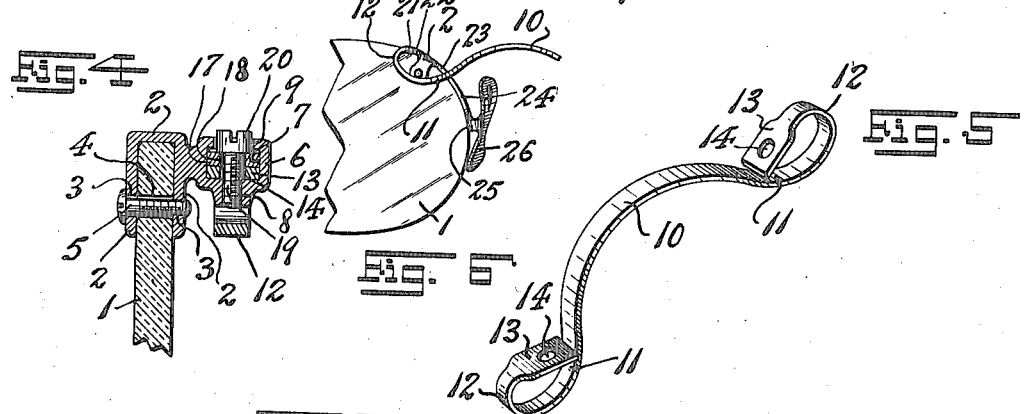
WITNESSES:
Eva E. Desch.
Samuel S. Coss.
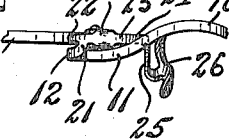
INVENTOR
Dallas F. Green,
BY
Fraentzel and Richards,
ATTORNEYS.

UNITED STATES PATENT OFFICE.

DALLAS F. GREEN, OF FORT WAYNE, INDIANA.

EYEGLASS-MOUNTING.

1,233,570.  Specification of Letters Patent.  Patented July 17, 1917.

Application filed September 30, 1916. Serial No. 122,980.

*To all whom it may concern:*

Be it known that I, DALLAS F. GREEN, a citizen of the United States, residing at Fort Wayne, in the county of Allen and State of Indiana, have invented certain new and useful Improvements in Eyeglass Mountings; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in eye-glass mountings; and the invention has reference, more particularly, to a novel construction of combined spring and bridge-piece for placing under gripping tension the nose-guards of the eye-glass mounting.

The present invention has for its principal object to provide a very simple, cheap and efficient construction of eye-glass mounting having a novel combined spring and bridge-piece, so connected with the lenses that the anchor points thereof are positioned above the plane of the normal line of vision of the wearer, and, therefore, removed from out of said normal line of vision. Furthermore, the novel construction of said combined spring and bridge-piece is such, that a maximum length of spring may be obtained, to render more comfortable, and yet secure, the pressure exerted by the nose-guards upon the nose of the wearer, while still obtaining a very neat and compact appearance of the mounting.

A further object of the present invention is to provide a novel construction of combined spring and bridge-piece, which is related to the lens-straps and nose-guards of the mounting in such a manner, that the tension thereof, as transmitted to the nose-guards, causes an eccentric-like movement of the latter toward the nose of the wearer, whereby the same are caused to easily and quickly ride up into a proper gripping position upon the bridge of the nose, at a point close to the juncture thereof with the orbital cavities, thus properly positioning the lenses in front of the eyes, and at the same time rendering the supporting contact of said nose-guards with the nose comfortable and secure; and to such ends the construction of the novel spring and bridge-piece permits of both a winding and lifting movement at the anchored ends of the spring when the lenses and nose-guards are moved apart, which combined winding and lifting movements are reversed when the spring is permitted to exert the tension, thus stored therein, upon the nose-guards, and thus resulting in transmitting to said nose-guards the peculiar eccentric-like movement toward each other and the nose of the wearer.

Other objects of this invention, not at this time more particularly enumerated, will be clearly understood from the following detailed description of the same.

With the various objects of the present invention in view, the same consists, primarily, in the novel eye-glass mounting hereinafter set forth; and, furthermore, the invention consists, in the several novel arrangements and combinations of the devices and parts, as well as in the details of the construction of said parts, all of which will be more fully described in the following specification, and then finally embodied in the claims which are appended to and which form an essential part of this specification.

The invention is clearly illustrated in the accompanying drawings, in which:—

Figure 1 is a front elevation of a pair of glasses provided with a novel mounting made according to and embodyig the principles of my present invention; Fig. 2 is a rear face view or elevation of the same, and Fig. 3 is a top edge view of the same.

Fig. 4 is a detail transverse section taken on line 4—4 in said Fig. 1, looking in the direction of the arrow $x$, said view being drawn on an enlarged scale; and Fig. 5 is a detail perspective view of the novel construction of combined spring and bridge-piece made according to the principles of my present invention, said view being also drawn on an enlarged scale.

Fig. 6 is a detail or fragmentary rear face view of a portion of a pair of eye-glasses, illustrating a slightly modified construction of my novel mounting therefor; and Fig. 7 is a detail top edge view of the same.

Similar characters of reference are employed in all of the hereinabove described views to indicate corresponding parts.

Referring now to the said drawings, the reference character 1 indicates the usual eye-glass lenses. The reference-character 2 indicates the bifurcated lens-straps, the members of which straddle the body of said lenses 1, at the upper edges of the latter, and preferably in a position intermediate of the inner ends and the central portions of said lenses 1, thus positioning the lens-straps 2, and the parts of the mounting anchored thereto in a position above, and thus removed from, the plane 1 of the normal line of vision through said lenses, when the latter are normally positioned in front of the eyes of the wearer. The members of said lens-straps are provided with the usual perforations 3, one of which is internally screw-threaded, which register with an opening 4 through the body of said lenses, so that a fastening screw 5 may be passed therethrough to securely hold said lens-straps in proper embracing relation to said lenses, and the latter in proper secured relation to said lens-straps.

Connected with one side of said lens-straps 2, and preferably so as to form an integral part thereof, are laterally and rearwardly projecting anchor-boxes 6, the same being open at their ends to give entrance to the interiors 7 thereof, which provide receiving-sockets. The lower or under-side wall of each anchor-box 6 is provided with a screw-threaded vertical opening 8, and the upper-side wall of each anchor-box 6 is provided with an opening 9 registered over said screw-threaded opening 8.

Extending between the lenses 1 is the novel construction of combined spring and bridge-piece, which provides an important element of my novel eye-glass mounting. Said combined spring and bridge-piece comprises a central upwardly and forwardly bowed portion 10 adapted to bridge the nose of the wearer when the mounting is normally affixed thereon. The respective opposite ends of said bowed portion 10 terminate in curved downwardly and outwardly extending arms 11, which extend past the inner sides of said anchor-boxes 6, and then beneath the same, said arms 11 in turn terminating in upwardly and inwardly coiled spring-portions 12, at the free ends of which are formed anchor-plates 13, each having a hole or perforation 14. The respective anchor-plates 13 are preferably inserted through the outer side openings of said anchor-boxes 6, so as to extend into the receiving-sockets 7 formed thereby, and so that their holes or perforations 14 are registered over the screw-threaded openings 8.

The reference character 15 indicates the nose-guards of the eye-glass mounting. Each nose-guard 15 is provided with a supporting arm 16, having at its free end an anchor-plate 17 provided with a hole or perforation 18. Said anchor-plates 17 are respectively inserted through the inner side openings of said anchor-boxes 6, so as to extend into the receiving-sockets 7 formed thereby, and so that their holes or perforations 18 are registered with said holes or perforations 14 of said anchor-plates 13 of said combined spring and bridge-piece, and over the screw-threaded openings 8 of said anchor-boxes 6. Fastening screws 19 are inserted through the openings 9 of said anchor-boxes 6 and thence through the respective registered holes or perforations 14 and 18 so that the same may be screwed into the screw-threaded openings 8 of said anchor-boxes 6. The heads 20 of said fastening screws 19 pass through the openings 9 of said anchor-boxes into clamping contact with the respective anchor-plates 13 and 17, thus firmly securing said combined-spring and bridge-piece and said nose-guards in anchored or fixed relation to said anchor-boxes 6. Said supporting arms 16 curve rearwardly and downwardly from their anchor-plates 17, and said nose-guards are secured to the lower free ends thereof in any suitable manner, so as to be supported in proper relation to the lenses 1, and in a plane to the rear of the latter.

By grasping the lenses 1 and moving the same apart, with a slight lifting movement, the arched bowed-portion 10 of the combined spring and bridge-piece will tend to straighten out, thereby slightly lifting its ends, and since said ends terminate in the coiled spring-portions 12, such movement of the lenses 1 will also tend to tighten or wind up the said coiled spring-portions 12. The sum of these movements tends to separate said nose-guards 15, with an eccentric-like path of movement as to the latter, and at the same time tends to store up tension in the said combined spring and bridge-piece. When the eye-glasses are now applied to the nose of the wearer, and the lenses 1 released, the tension stored in said combined spring and bridge-piece tends to return the same to normal initial position, and consequently transmits a reverse movement to the nose-guards toward the nose of the wearer. The downward movement of the ends of the combined spring and bridge-piece tends to press the nose-guards directly toward the nose, whereas the loosening or unwinding of the coiled spring-portions 12 tends to transmit to the nose-guards a slight upward movement. The sum of these two movements tends, therefore, to cause the nose-guards to move upwardly on the bridge of the nose toward the bony ridge which spreads out above and overhangs the orbital cavities and at the same time presses the nose-guards against the nose, such composite movement taking an eccentric-like path, and resulting in pressing the upper ends of said nose-guards up into the juncture of the nose with the orbital cavities, consequently always assuring a positioning of the lenses 1 in proper relative plane to the eyes and a snug fitting of the nose-guards to the nose.

The length of spring made available through the combined construction of coiled spring-portions 12 and resilient bowed-portion 10, tends to increase the resiliency of the spring as a whole, and to render the pressure exerted thereby, while strong enough to assure a firm gripping of the nose-guards, easy and comfortable to the wearer.

Referring now to Figs. 6 and 7 of the accompanying drawings, I have illustrated therein a slightly modified construction of eye-glass mounting, still embodying, however, the main novel features and principles of my present invention. In this construction I provide the lens-straps 2 and the novel combined spring and bridge-piece comprising the bowed-portion 10, and the downwardly and outwardly extending arms 11 which terminate in the coiled spring-portions 12. I eliminate, however, the anchor-boxes 6, and connect the end of said coiled spring-portions 12, by means of off-setting portions 21 directly and integrally to the outer embracing end 22 of said lens-straps 2. The inner embracing end 23 of said lens-straps 2 are extended to form nose-guard supporting-arms 24, which extend downwardly around the periphery of said lenses for a suitable distance, then being turned rearwardly to provide an off-set portion 25 to which the nose-guards 26 are connected. Thus it will be seen, that this construction provides a single, one-piece mounting, combining all the essential elements of my present invention with reference to the relation of the parts one to another, and yet capable of being blanked out of sheet metal, and then bent into the form required, as above described. Such modified construction is of course very cheap and easily manufactured. In operation and effects said modified construction acts in the same manner as already above described.

I am aware that some changes may be made in the several arrangements and combinations of the devices and parts, as well as in the details of the construction of the same, as described in the accompanying specification, without departing from the scope of the invention as defined in the appended claims. Hence, I do not limit my invention to the exact arrangements and combinations of the devices and parts as set forth in the foregoing specification, nor do I confine myself to the exact details of the construction of the said parts as illustrated in the accompanying drawings.

I claim:—

1. The combination with a pair of lenses of lens-straps connected therewith at their upper edges above the normal line of vision therethrough, nose-guards, downwardly and rearwardly curved supporting arms to the lower ends of which said nose-guards are connected, the upper ends of said supporting arms being connected with said lens-straps, a combined spring and bridge-piece comprising a central upwardly and forwardly bowed portion, and upwardly turned convolute spring-portions connected with the ends of said bowed portion, the free ends of said convolute spring-portions being connected with said lens-straps.

2. The combination with a pair of lenses of lens-straps connected therewith at their upper edges above the normal line of vision therethrough, an anchor-box connected with each lens-strap so as to extend rearwardly and horizontally therefrom, a combined spring and bridge-piece comprising a central upwardly and forwardly bowed portion, the ends of said bowed portion extending downwardly and outwardly so as to pass underneath said anchor-boxes, upwardly turned convolute spring-portions forming an integral part of the ends of said bowed portion, the free ends of said convolute spring-portions respectively entering said anchor-boxes, nose-guards, downwardly and rearwardly curved supporting-arms to the lower ends of which said nose-guards are connected, the upper ends of said supporting-arms respectively entering said anchor-boxes, and means for securing the ends of said convolute spring-portions and the ends of said supporting-arms within said anchor-boxes.

3. The combination with a pair of lenses of lens-straps connected therewith at their upper edges above the normal line of vision therethrough, an anchor-box connected with each lens-strap so as to extend rearwardly and horizontally therefrom, a combined spring and bridge-piece comprising a central upwardly and forwardly bowed portion, the ends of said bowed portion extending downwardly and outwardly so as to pass underneath said anchor-boxes, upwardly turned convolute spring-portions forming an integral part of the ends of said bowed portions, anchor-plates integrally connected with the free ends of said convolute spring-portions and adapted to enter said respective anchor-boxes through the outer sides thereof, nose-guards, downwardly and rearwardly curved supporting-arms to the lower ends of which said nose-guards are connected, anchor plates integrally connected with the upper ends of said supporting-arms and adapted to enter said respective anchor-boxes through the inner sides thereof, and means for securing said respective anchor plates within said anchor-boxes.

4. The combination with lens-straps having rearwardly and horizontally projecting anchor-boxes of a spring member comprising a central upwardly and forwardly bowed portion, convolute spring-portions integrally connected with the ends of said bowed portion and circling beneath said anchor-boxes into which their free ends turn and are secured, nose-guards, and downwardly and rearwardly extending supporting-arms to which said nose-guards are connected, the upper ends of said supporting-arms entering said anchor-boxes and being secured therein.

In testimony, that I claim the invention set forth above I have hereunto set my hand this 28th day of September, 1916.

DALLAS F. GREEN.

Witnesses:
GEORGE D. RICHARDS,
FREDK. C. FRAENTZEL.